United States Patent
Tsao

(10) Patent No.: US 11,138,295 B2
(45) Date of Patent: Oct. 5, 2021

(54) METHOD FOR SECURELY UPDATING FIRMWARE COMPONENTS AND DOCKING STATION USING THE SAME

(71) Applicant: GOOD WAY TECHNOLOGY CO., LTD., New Taipei (TW)

(72) Inventor: Chih-Ming Tsao, New Taipei (TW)

(73) Assignee: GOOD WAY TECHNOLOGY CO., LTD., New Taipei (TW)

( * ) Notice: Subject to any disclaimer, the term of this patent is extended or adjusted under 35 U.S.C. 154(b) by 179 days.

(21) Appl. No.: 16/298,288

(22) Filed: Mar. 11, 2019

(65) Prior Publication Data

US 2020/0293634 A1 Sep. 17, 2020

(51) Int. Cl.
| | |
|---|---|
| *G06F 21/12* | (2013.01) |
| *G06F 8/65* | (2018.01) |
| *G06F 8/41* | (2018.01) |
| *G06F 21/72* | (2013.01) |
| *G06F 13/40* | (2006.01) |
| *G06F 21/51* | (2013.01) |

(52) U.S. Cl.
CPC .............. *G06F 21/123* (2013.01); *G06F 8/44* (2013.01); *G06F 8/65* (2013.01); *G06F 13/4068* (2013.01); *G06F 21/51* (2013.01); *G06F 21/72* (2013.01)

(58) Field of Classification Search
CPC . G06F 21/123; G06F 8/65; G06F 8/44; G06F 21/72; G06F 13/4068; G06F 21/51; G06F 8/654
USPC .......................................................... 726/22
See application file for complete search history.

(56) References Cited

U.S. PATENT DOCUMENTS

| | | | |
|---|---|---|---|
| 8,555,273 B1 | 10/2013 | Chia | |
| 2007/0143530 A1 | 6/2007 | Rudelic et al. | |
| 2014/0365755 A1 | 12/2014 | Liu et al. | |
| 2017/0212750 A1* | 7/2017 | Stutzenberger | ..... F04B 43/1261 |
| 2017/0250817 A1* | 8/2017 | Bonzini | ................ H04L 9/3247 |
| 2020/0259805 A1* | 8/2020 | Grobelny | .............. G06F 1/1632 |

FOREIGN PATENT DOCUMENTS

TW 200711436 A 3/2007

* cited by examiner

*Primary Examiner* — Kambiz Zand
*Assistant Examiner* — Aubrey H Wyszynski
(74) *Attorney, Agent, or Firm* — Li & Cai Intellectual Property (USA) Office

(57) ABSTRACT

The present disclosure provides a method for securely updating firmware components, which is used in connection with an electronic device including a universal serial bus human interface device interface. The method includes: downloading a deformed patch executable file by the electronic device, wherein the deformed patch executable file is deformed from a patch executable file including a plurality of binary files, and each of the binary files is configured with an address reference label; and executing the deformed patch executable file and verifying whether a digital signature of the deformed patch executable file is authorized or not. If the digital signature of the deformed patch executable file is authorized, providing an update tool for updating the corresponding firmware component. If the digital signature of the deformed patch executable file is not authorized, prompting that the digital signature is unauthorized.

11 Claims, 12 Drawing Sheets

FIG. 7

METHOD FOR SECURELY UPDATING FIRMWARE COMPONENTS AND DOCKING STATION USING THE SAME

FIELD OF THE DISCLOSURE

The present disclosure relates to a method for updating a firmware, and more particularly to a method of updating a firmware component at a high security level and a docking station using the same.

BACKGROUND OF THE DISCLOSURE

With the rapid development of the electronics industry, electronic devices such as smart phones and tablets have become an indispensable part of people's daily lives. In order to meet user needs for innovation, and to improve user satisfaction, these electronic devices are updated frequently. If the user intends to update a firmware of a device, the user usually needs to use an update tool provided by the manufacturer or a third party to sequentially read binary files and then update the firmware.

Reference is made to FIG. 1, which is a schematic diagram of a conventional method of updating firmware components. If the user wants to update a version of the firmware of the phones or tablets, the user needs to select a variety of firmware parameters, such as a stock keeping unit (SKU) and a version. In addition, the user needs to download compressed files or binary files of the firmware components such as Driver, HUBIspTool.exe, etc. from an official website. The downloaded binary files of the firmware components are placed in a specific directory in an internal storage space of a computer, a tablet or a phone. If the user downloads the binary files of the firmware components by the computer, the user needs to use a micro universal serial bus (micro USB) cable to connect the phone or the tablet to the computer, and copies or moves the downloaded binary files of the firmware components to the specific directory in the internal storage space of the phone, and then removes the micro USB cable from the phone or the tablet and the computer. Next, the user needs to reboot the phone or the tablet and confirm a prompting message indicating that an update file is available for update in a status bar of the phone or the tablet. Finally, when the update tool detects the update files of a system, the user needs to update the firmware components according to the prompting message from the system. As described above, the conventional method for updating firmware components is complicated. Therefore, how the correct binary files of the firmware components to be updated can be selected from the many files may cause great inconvenience to the user.

Chinese patent application (CN 105100205A) discloses an updating method for a system, a server and an electronic device, solving the problem of the electronic device having a low overall success probability of updating the system by using the air (OTA) due to the large OTA network and other reasons. The method includes the following steps: obtaining a first description information of a function module of an operating system that is sent by the electronic device connected to the server; obtaining a second description information corresponding to the function module to be updated from a database to be updated based on the first description information; determining whether the first description information matched with the second description information or not. If the first description information does not match with the second description information, an update message of the function module of the operating system is sent to the electronic device. However, in this patent application, individual function modules in the operating systems are updated respectively rather than updated in entirety.

Chinese patent application (CN100363921C) discloses a system management framework for application delivery and configuration management of mobile devices. The framework includes a management server and a mobile computing device. The management server is configured to communicate a download instruction for a purpose of the configuration management of the mobile computing device. The mobile computing device is configured to connect to the management server through a non-persistent connection. The mobile computing device requests download instructions from the management server to confirm any propositions that can be downloaded and installed by the mobile computing device. Any of the propositions presented by the management server represents one or more files that have been available since a last successful download operation conducted by the mobile computing device. The mobile computing device allows a user to accept or reject downloads and installations of any one or more of the propositions. However, in this patent application, the operating procedure of the update scheme proposed is complicated and is not related to the update of the firmware components.

SUMMARY OF THE DISCLOSURE

In response to the above-referenced technical inadequacies, the present disclosure provides a method for securely updating firmware components, in combination with an electronic device including a universal serial bus human interface device. The method includes the following steps: downloading a deformed patch executable file by the electronic device, wherein the deformed patch executable file is deformed from a patch executable file including a plurality of binary files, and each of the binary files is configured with an address reference label; executing the deformed patch executable file and verifying whether a digital signature of the deformed patch executable file is authorized or not, in response to determining that the digital signature of the deformed patch executable file is authorized, an update tool for updating the corresponding firmware component is provided, in response to determining that the digital signature of the deformed patch executable file is not authorized, prompting that the digital signature is unauthorized.

In an embodiment of the method for securely updating firmware components, the deformed patch executable file is deformed from the patch executable file by executing a first algorithm, with which a compression program is executed on the binary files and then an encryption program is executed on the compressed binary files.

In addition, the present disclosure provides a docking station, in combination with an electronic device. The docking station includes a micro-programmed control unit, a micro-programmed control unit, a universal serial bus human interface device and a plurality of firmware components. The micro-programmed control unit and the firmware components are connected to the electronic device through the universal serial bus human interface device. The electronic device provides a deformed patch executable file. The deformed patch executable file is deformed from a patch executable file including a plurality of binary files. Each of the binary files is configured with an address reference label. The electronic device executes the deformed patch executable file and verifies whether a digital signature of the deformed patch executable file is authorized or not. When the digital signature of the deformed patch executable file is determined to be authorized, the electronic device provides an update instruction of an update tool for updating the corresponding firmware component, and the micro-programmed control unit is configured to execute a decompression program and a decryption program with a bootloader code to generate the patch executable file. When the digital signature of the deformed patch executable file is determined to be not authorized, the electronic device receives a prompting message that the digital signature is unauthorized.

As described above, the present disclosure provides the method for securely updating the firmware components and the docking station using the same can perform security updates on the firmware components. The present disclosure has significant benefits by integrating the plurality of the binary files into one patch executable file. For example, the user does not have to worry which file to be updated needs to be executed, and does not need to select the file to be updated. The encryption program executed on the binary files may include Hash, advanced encryption standard (AES), data encryption standard (DES), RSA encryption algorithm, and elliptic curve cryptography (ECC), etc. In addition, the digital signature can be added to the patch executable file for protection. Furthermore, since only one patch executable file is used, it is easy to store and to maintain, and the production time is saved without having to signing a plurality of files at the same time. When the update program is to be executed, a check is performed to determine whether the digital signature in the patch execution file is from the manufacturer and whether a signed content is still valid.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 7 is a schematic diagram of a digital signature of a deformed patch executable file that is verified to be authorized according to an embodiment of the present disclosure.

DETAILED DESCRIPTION OF THE EXEMPLARY EMBODIMENTS

Figure 1:
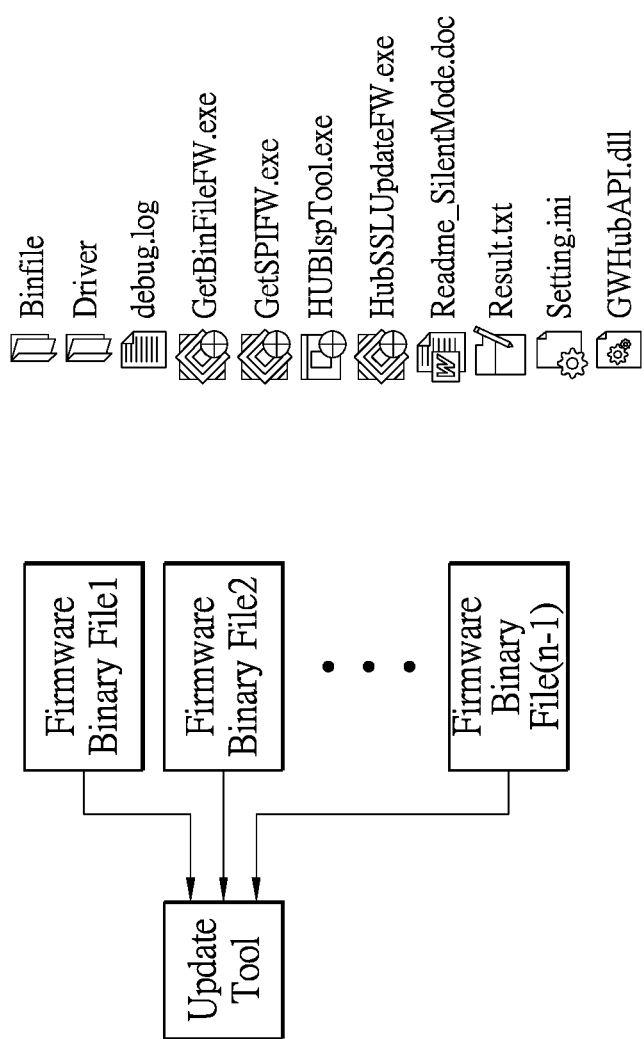
FIG. 1 is a schematic diagram of a conventional method for updating firmware components.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A variety of common configurations of general purpose or special purpose computing devices are available to one skilled in the art. The present disclosure uses common computing systems, environments and/or configurations. The computing systems include a mobile client device, a personal computer, a server computer, a laptop device, a multi-processor system, a single-chip system, a network personal computer (PC), a minicomputer, a mainframe computer, a decentralized computer, and a computing device with less functions than any of the above systems or devices, etc., but the present disclosure is not limited thereto.

Figure 2:
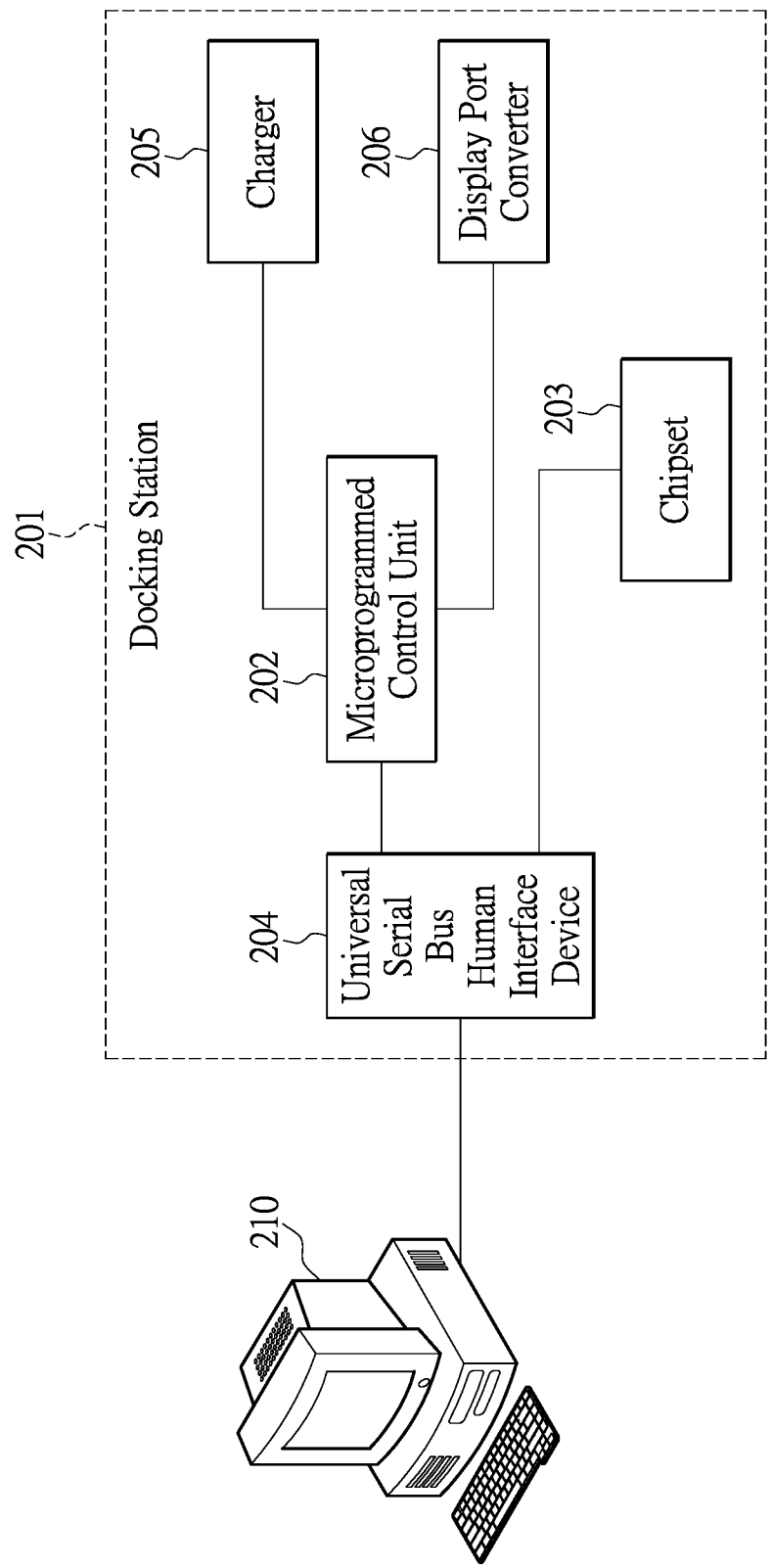
FIG. 2 is a schematic diagram of a docking station and an electronic device according to an embodiment of the present disclosure.

Reference is made to FIG. 2, which is a schematic diagram of a docking station 201 and an electronic device 210 that is used in combination with the docking station 201 according to an embodiment of the present disclosure. The docking station 201 includes a micro-programmed control unit (MCU) 202, a plurality of firmware components such as a chipset 203, a universal serial bus human interface device (USB HID) 204, a charger 205 and a display port converter 206. The micro-programmed control unit 202 and the chipset 203 are electrically connected to the electronic device 210 through the universal serial bus human interface device 204. In the embodiment, the universal serial bus human interface device 204 is used for the update of the firmware components. Most of the host devices such as a personal computer, a laptop device, a mobile phone and a tablet have USB HID protocols that can be used for the update of the firmware components. Common operating systems executed on the host devices such as Windows, MAC OS, IOS, Linux and Android support the USB HID protocol. A driver of the USB HID protocol is built into the electronic device 210 so that an additional driver is not required.

In an embodiment, a deformed patch executable file P'.exe is obtained from an external device. The deformed patch executable file P'.exe is deformed from a patch executable file P.exe that has a special data structure. The patch executable file P.exe includes binary files. An address reference label is set for each of the binary files and configured to record a size of each of the binary files.

In an embodiment, a compression program is executed on the binary files included in the patch executable file P.exe and then an encryption program is executed on the compressed binary files to generate the deformed patch executable file P'.exe. The compression program may include at least one of run-length coding, dictionary coding, local conformation prediction, entropy coding, Slepian-Wolf coding, discrete cosine transform, fractal compression, fractal transform, wavelet compression, vector quantization, linear predictive coding, Wyner-Ziv coding, and other algorithms. The encryption program may include at least one of Hash, advanced encryption standard (AES), data encryption standard (DES), RSA encryption algorithm, and elliptic curve cryptography (ECC), and other algorithms.

In an embodiment, the electronic device 210 executes the deformed patch executable file and verifies whether a digital signature of the deformed patch executable file is authorized or not. If the digital signature of the deformed patch executable file is determined not authorized, the electronic device 210 prompts that the digital signature is unauthorized and does not execute any program. If the digital signature of the deformed patch executable file is determined authorized, the electronic device 210 provides an update instruction of an update tool for updating the corresponding firmware component, and the micro-programmed control unit is configured to execute a decompression program and a decryption program with a bootloader code to generate the patch executable file.

Figure 3:
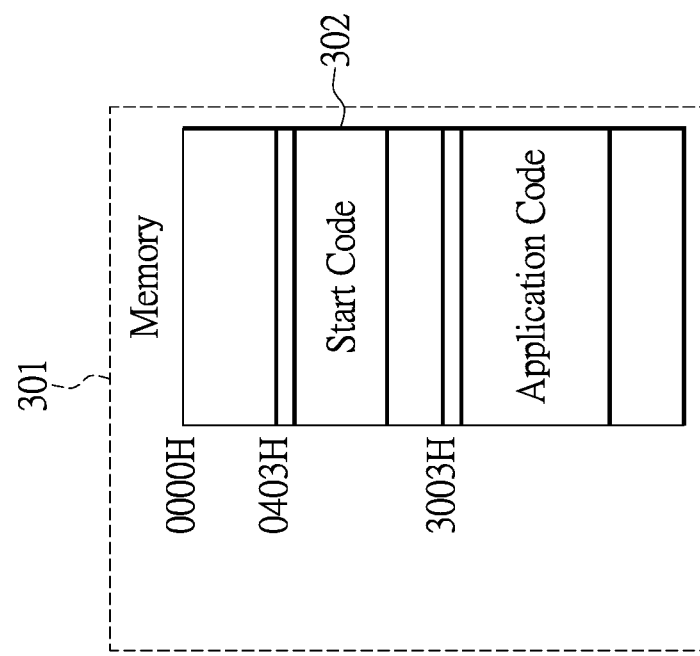
FIG. 3 is a schematic diagram of a bootloader code set by a micro-programmed control unit of a docking station and executed in a memory according to an embodiment of the present disclosure.

Reference is further made to FIG. 3, which is a schematic diagram of a bootloader code 302 set by the micro-programmed control unit 202 of the docking station 201 and executed in a memory 301 according to an embodiment of the present disclosure. The deformed patch executable file to be updated is restored to its original state and updated, and the patch executable file updated by the micro-program control unit 202 can be directly restored in the memory 301 for updating. The micro-programmed control unit 202 has the bootloader code 302, which can prevent the firmware components from being damaged. In addition, the micro-programmed control unit 202 has a software version checking mechanism. Once an in-system programming (ISP) update process fails or is interrupted, the ISP process may be repeated. After the in-system programming is completed, the micro-programmed control unit 202 detects whether a checksum is completed. The checksum is a value that is calculated based on a content of a data packet and sent along with the data packet. After the receiver receives the data packet, the receiver calculates a value based on the content of the data packet, and compares the calculated value with the received value. If the calculated value is the same as the received value, the receiver determines that the data is correct.

Figure 4:
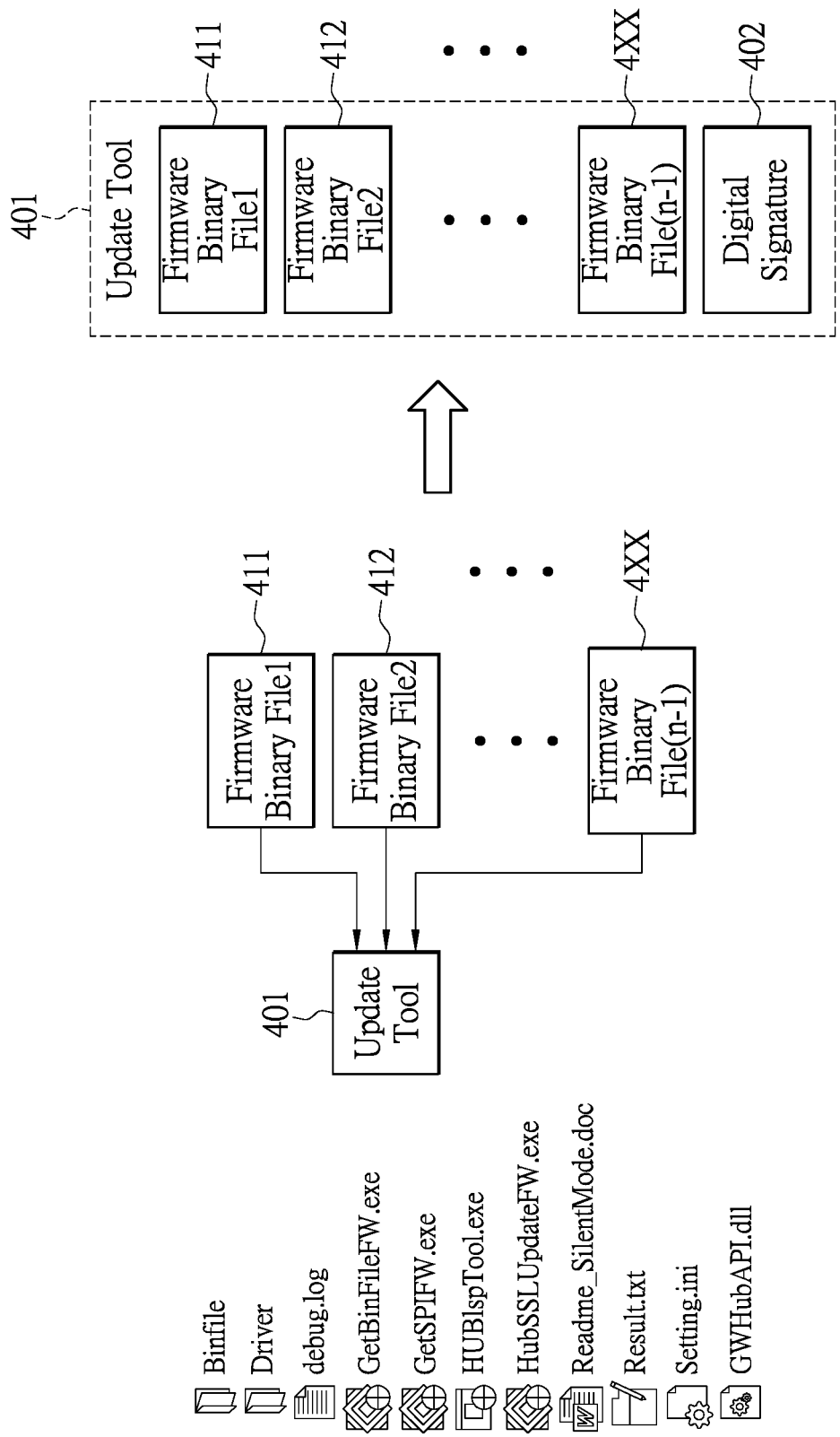
FIG. 4 is a schematic diagram of an update tool provided by a third party according to an embodiment of the present disclosure.

Reference is made to FIG. 4, which is a schematic diagram of an update tool 401 is provided by a third party according to an embodiment of the present disclosure. In an embodiment, the present disclosure integrates the binary files 411, 412 to 4XX to be updated. By verifying a digital signature 402, it is confirmed that the third-party programs and the binary files 411, 412 to 4XX are correct, and then they are removed. In addition, the binary files 411, 412 to 4XX are integrated into a top layer of the patch executable file and may be used for the third-party program.

As is well known in the art, the instructions may be executed on the computer to implement functions of the computer in a variety of ways, for example, program modules are executed on the computer. For example, the computer may execute program modules including routines, programs, objects, components and data structures, etc. that are used to accomplish a specific task or implement a specific abstract data. The task may also be done by a remote processing device connected to the computer via a communication network. In a decentralized computing environment, the program modules may be placed in local and remote computer storage media. The instructions and the program modules are stored in the components of the computer such as the storages or medias that can be read by the computer at different times. The programs are typically distributed, for example, on a floppy disk, a CD-ROM, a DVD, or a communication media such as a modulated signal. The programs are installed or loaded into a second type of storage of the computer such as a hard drive. When the programs are executed, the programs are at least partially loaded into a first type of electronic storage of the computer such as the memory. The media including the above and other various types of the readable media of the computer are used in combination with a microprocessor or other processors to execute the instructions, and the programs and the modules of the steps and the operations as described above.

The computer typically includes various readable media. The readable media of the computer may be any available media, such as a volatile media, a nonvolatile media, a removable media and a non-removable media, which can be accessed by the computer. The readable media of the computer may include storage media and communication medias, but the present disclosure is not limited thereto. The storage medias of the computer includes the volatile media, the nonvolatile media, the removable medias and the non-removable medias, which are used for the information of the storage such as the instructions, the data structures, the program modules or other data that can read by the computer. The computer storage medias may include, but is not limited to, a RAM, a ROM, a EEPROM, a flash memory, a CD-ROM, a DVD or other optical disk storage, a tape cartridge, a magnetic tape, a disk storage or other magnetic storage devices, or any other medias used for accessing the information of the computer, but the present disclosure is not limited thereto. The communication media may include a modulated signal such as a carrier wave or other transmission mechanisms, which carries the instructions, the data structures, the program modules or other data that can read by the computer.

Figure 5A:
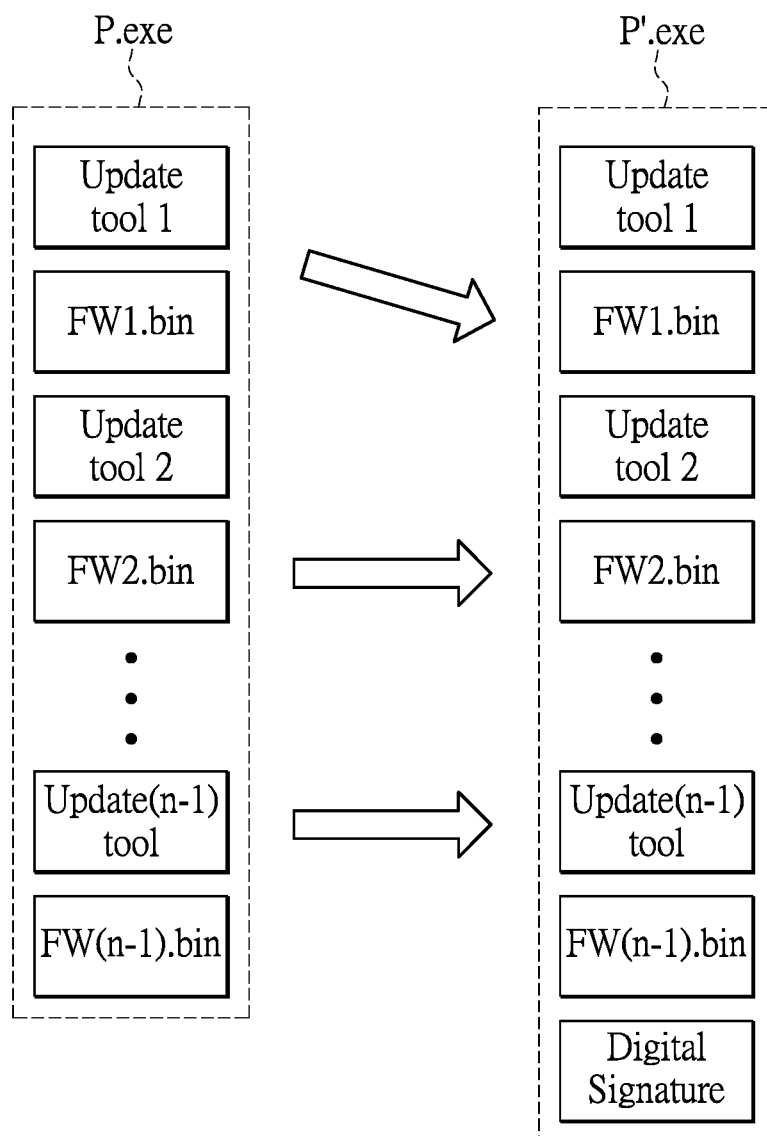
FIG. 5A is a schematic diagram of a deformed patch executable file deformed from a patch executable file according to an embodiment of the present disclosure.

Reference is made to FIG. 5A, which is a schematic diagram of the deformed patch executable file P'.exe deformed from the patch executable file P.exe according to an embodiment of the present disclosure. The firmware components to be updated such as Driver, HUBIspTool.exe, Setting.ini and other files included in the patch executable file P.exe are compressed and packaged, and a digital signature program is executed on the patch executable file P.exe to generate the deformed patch executable file P'.exe. In this way, all the files to be updated are integrated and condensed into a single executable file.

Figure 5B:
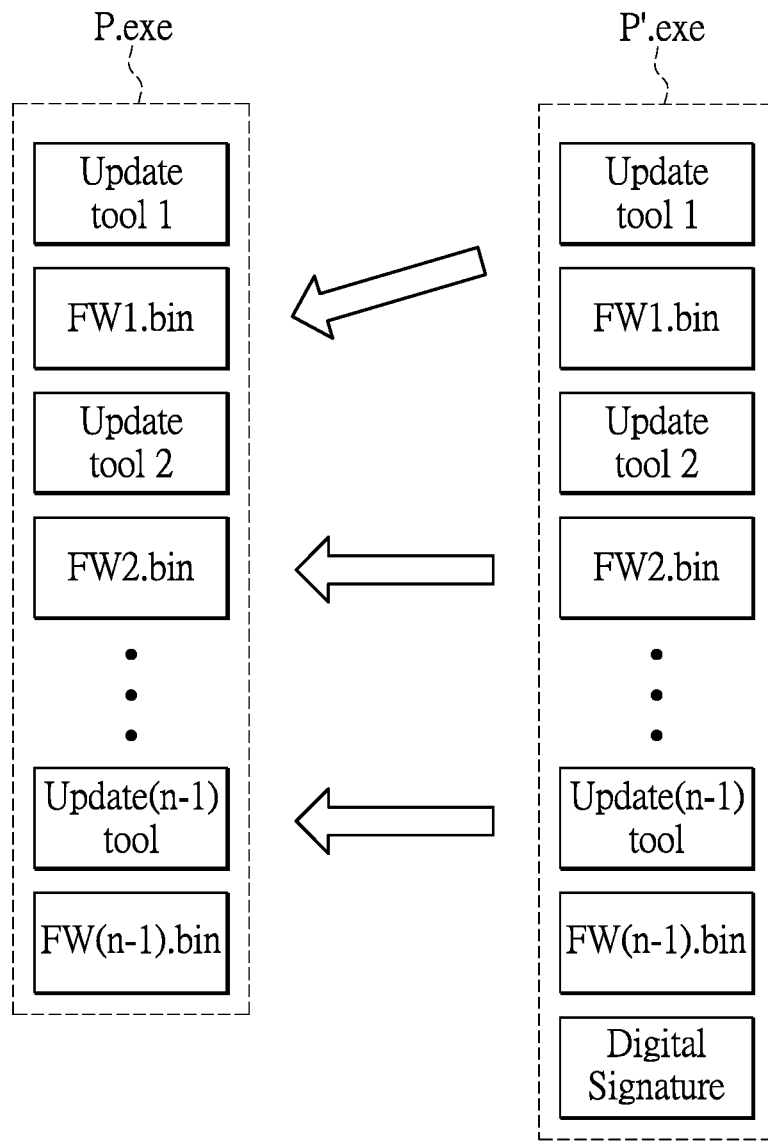
FIG. 5B is a schematic diagram of firmware components securely updated with a deformed patch executable file according to an embodiment of the present disclosure.

Reference is made to FIG. 5B, which is a schematic diagram of firmware components securely updated with the deformed patch executable P'.exe according to an embodiment of the present disclosure. After the digital signature in the deformed patch execution file P'.exe is verified, the deformed patch execution file P'.exe can be restored to the patch execution file P.exe for subsequent firmware update.

Figure 6A:
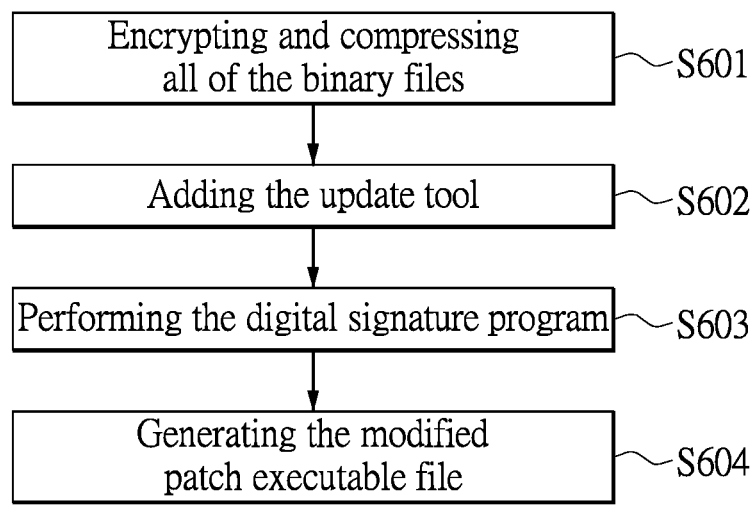
FIG. 6A is a flowchart diagram of a deformed patch executable file deformed from a patch executable file according to an embodiment of the present disclosure.

Reference is further made to FIGS. 6A and 5A, which are flowchart diagrams of the deformed patch executable file P'.exe deformed from the patch execution file P.exe according to an embodiment of the present disclosure. In step S601, all of the binary files are encrypted and compressed to generate the deformed patch executable file P'.exe.

In one embodiment of the present disclosure, the universal serial bus human interface device is connected to the electronic device, and the deformed patch executable file P'.exe is downloaded by the electronic device. The deformed patch executable file P'.exe is deformed from the patch executable file P.exe including the plurality of binary files. The address reference label is configured for each of the binary files. The actual sizes of the binary files may be tracked according to the address reference labels, thereby preventing contents of bits in the binary files from being tampered with.

In an embodiment, the deformed patch executable file P'.exe is generated by executing a first algorithm, with which an encryption program is executed on each of the binary files and then a compression program is executed on the encrypted binary files.

The encryption program may include at least one or a combination of Hash, advanced encryption standard (AES), data encryption standard (DES), RSA encryption algorithm, and elliptic curve cryptography (ECC) and other algorithms. The compression program may include at least one or a combination of run-length coding, dictionary coding, local conformation prediction, entropy coding, Slepian-Wolf coding, discrete cosine transform, fractal compression, fractal transform, wavelet compression, vector quantization, linear predictive coding and Wyner-Ziv coding and other algorithms.

In another embodiment, the deformed patch executable file P'.exe is generated by executing the first algorithm, with which the compression program is executed on the binary files and then the encryption program is executed on the compressed binary files. The specific contents of the compression and encryption algorithms are described above and thus will not be described again.

Reference is further made to FIGS. 5A and 6A. In step S602, the deformed patch executable file P'.exe is added to the update tool for subsequent update of the firmware.

In step S603, the digital signature program may be executed to add the digital signature to the deformed patch executable file P'.exe.

In an embodiment, in step S604, the final deformed patch execution file P'.exe is generated by executing the digital signature program associated with the address reference labels of the binary files on the deformed patch execution file P'.exe. If the content of any of the bits in the deformed patch execution file P'.exe is tampered with, the address reference label indicates that the tampered content of the bit of the deformed patch execution file P'.exe does not match with the original content of the bits of the deformed patch execution file P'.exe. The electronic device executes the deformed patch executable file P'.exe and verifies whether the digital signature of the deformed patch executable file P'.exe is authorized or not. If the digital signature of the deformed patch executable file P'.exe is determined authorized, the update tool is configured to update the firmware components. If the digital signature of the deformed patch executable file P'.exe is determined not authorized, the electronic device prompts that the digital signature is unauthorized.

Figure 6B:
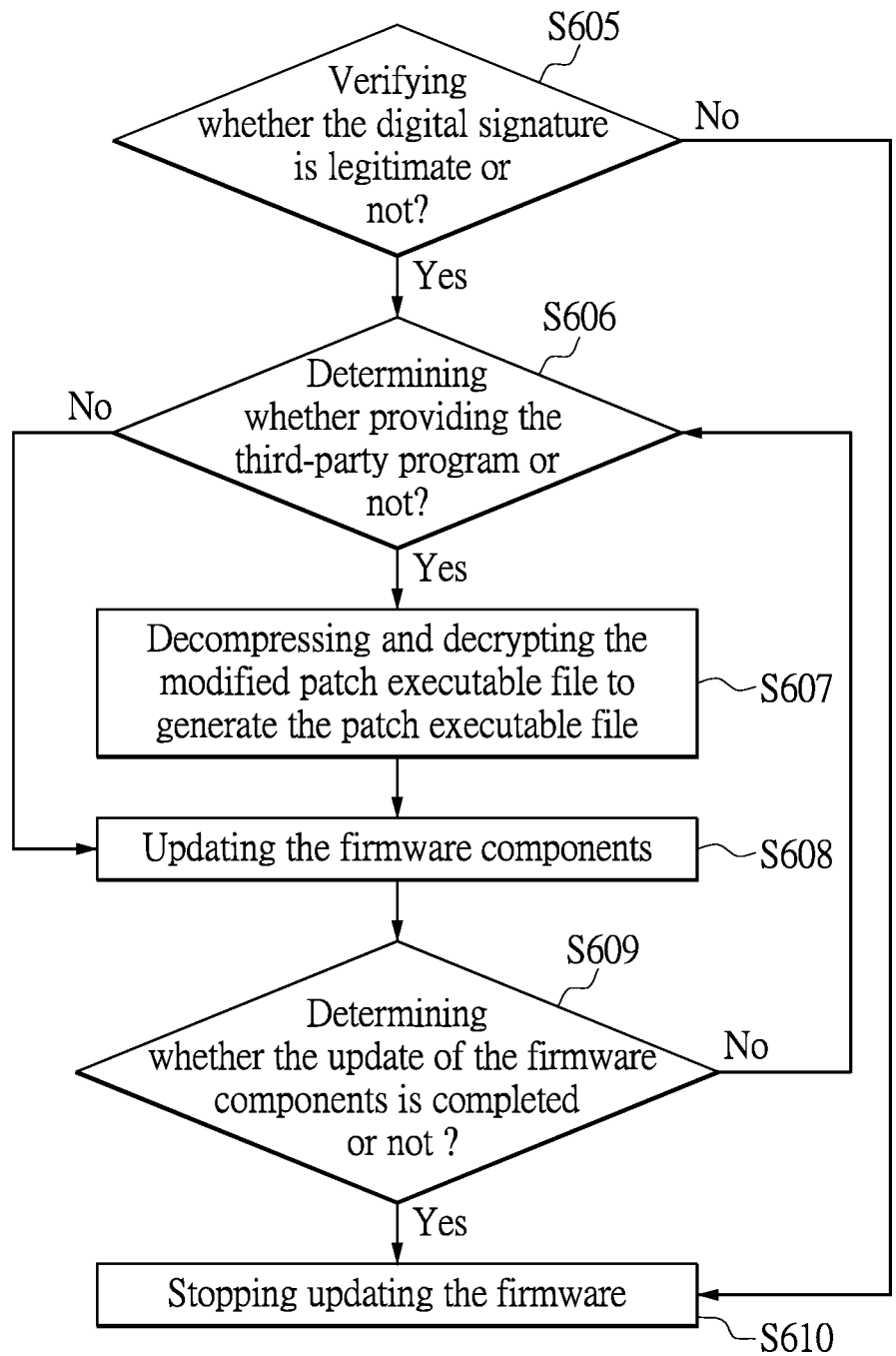
FIG. 6B is a flowchart diagram of firmware components securely updated with a deformed patch executable file according to an embodiment of the present disclosure.

Reference is made to FIGS. 5B and 6B. FIG. 6B is a flowchart diagram of firmware components securely updated with the deformed patch executable file P'.exe according to the embodiment of the present disclosure.

In step S605, the source and the contents of the electronic device verifies whether the digital signature of the deformed patch executable file is authorized or not. If the digital signature of the deformed patch executable file is determined not authorized, the electronic device prompts that the digital signature is unauthorized. If the digital signature of the deformed patch executable file is determined authorized, the process proceeds to step S606.

In step S606, the electronic device confirms whether the third-party program associated with the firmware components to be updated can be obtained from a factory. If the electronic device cannot obtain the third-party program, the process proceeds to step S608. If the electronic device can obtain the third-party program, the process proceeds to step S607.

In step S607, the deformed patch executable file P'.exe is decompressed and decrypted to generate the patch execution file P.exe. In an embodiment, the micro-programmed control unit executes the second algorithm with the bootloader code to update the firmware component according to the update instruction of the update tool. In detail, the executed second algorithm includes the decompression program corresponding to the compression program and the decryption program corresponding to the encryption program, so as to generate at least one of the binary files. In another embodiment, the binary files generated by the above decompression program and the decryption program may be used for the third-party program.

In step S608, all the deformed patch executable files P'.exe to be updated are restored to the original patch executable file P. exe, and then the original patch executable file P. exe of the firmware components are updated. In an embodiment, the universal serial bus human interface device is used for the update of the firmware components. Most common host devices such as personal computers, laptop devices, mobile phones and tablets have the USB HID protocols and can be used for the update of the firmware components. The common operating systems executed on the host devices such as Windows, MAC OS, IOS, Linux and android support the USB HID protocol. A driver of the USB HID protocol is built into the electronic device 210 and thus an additional driver is not required. In addition, the patch executable file P.exe updated by the micro-programmed control unit may be restored and updated in the memory. The micro-programmed control unit has the bootloader code, which can prevent the firmware components from being damaged. In addition, the micro-programmed control unit 202 has a software version checking mechanism. Once an in-system programming (ISP) update process fails or is interrupted, the ISP process may be repeated. After the in-system programming is completed, the micro-programmed control unit 202 detects whether checksum is completed. The checksum is a value that is calculated based on a content of a data packet and sent along with the data packet. After the receiver receives the data packet, the receiver calculates a value based on the content of the data packet, and compares the calculated value with the received value. If the calculated value is the same as the received value, the receiver determines that the data is correct.

In step S609, it is determined whether the update of the firmware component is stopped or not. If the update of the firmware component needs to be performed continually, step S606 is performed again. If the update of the firmware component does not need to be performed, the update process of the firmware component is stopped in step S610.

Figure 7:
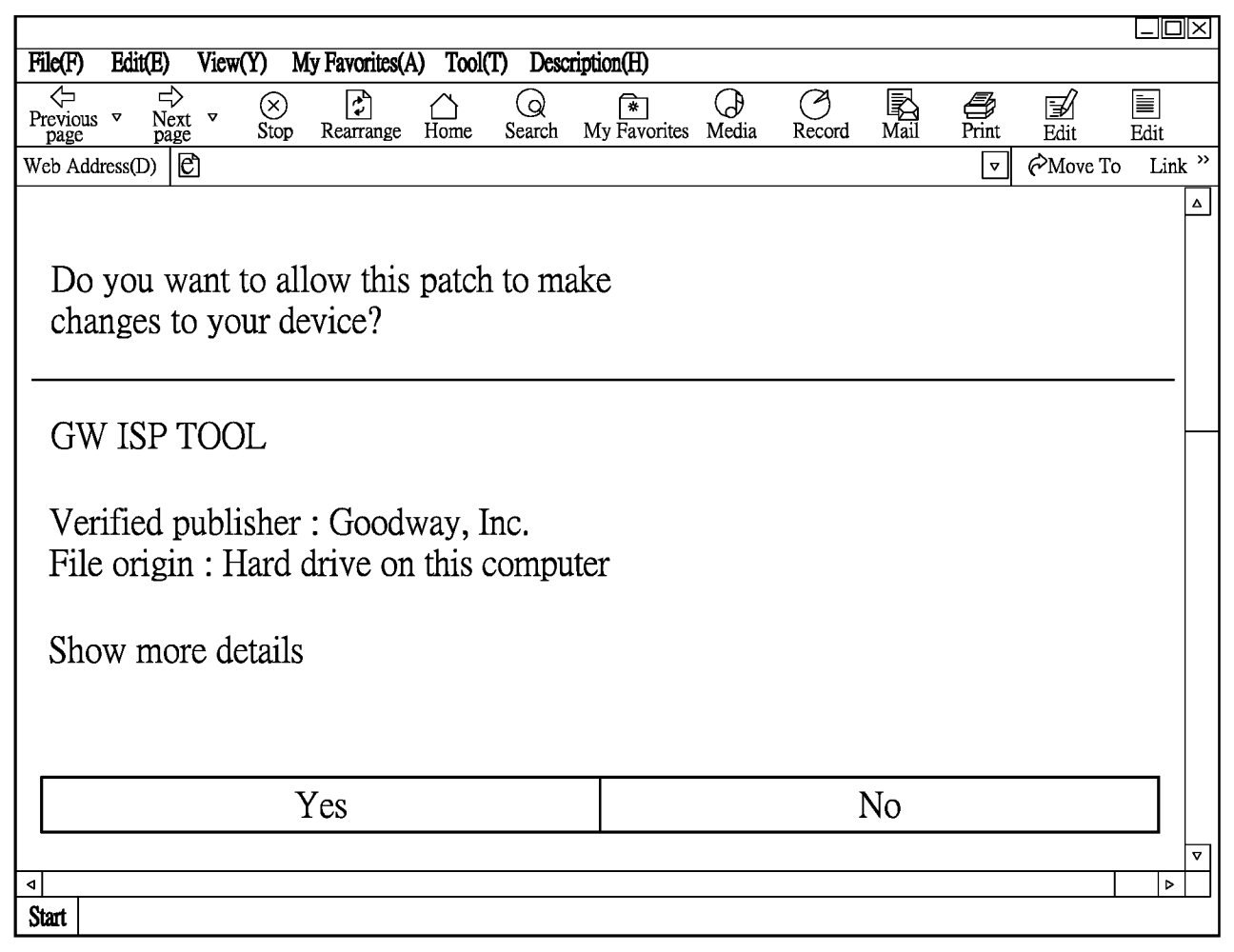

Reference is made to FIG. 7, which is a schematic diagram of a digital signature of a deformed patch executable file that is verified to be from a manufacturer. A displayer of the electronic device prompts that the digital signature is authorized, and asks a user to confirm whether to update the firmware component.

Figure 8:
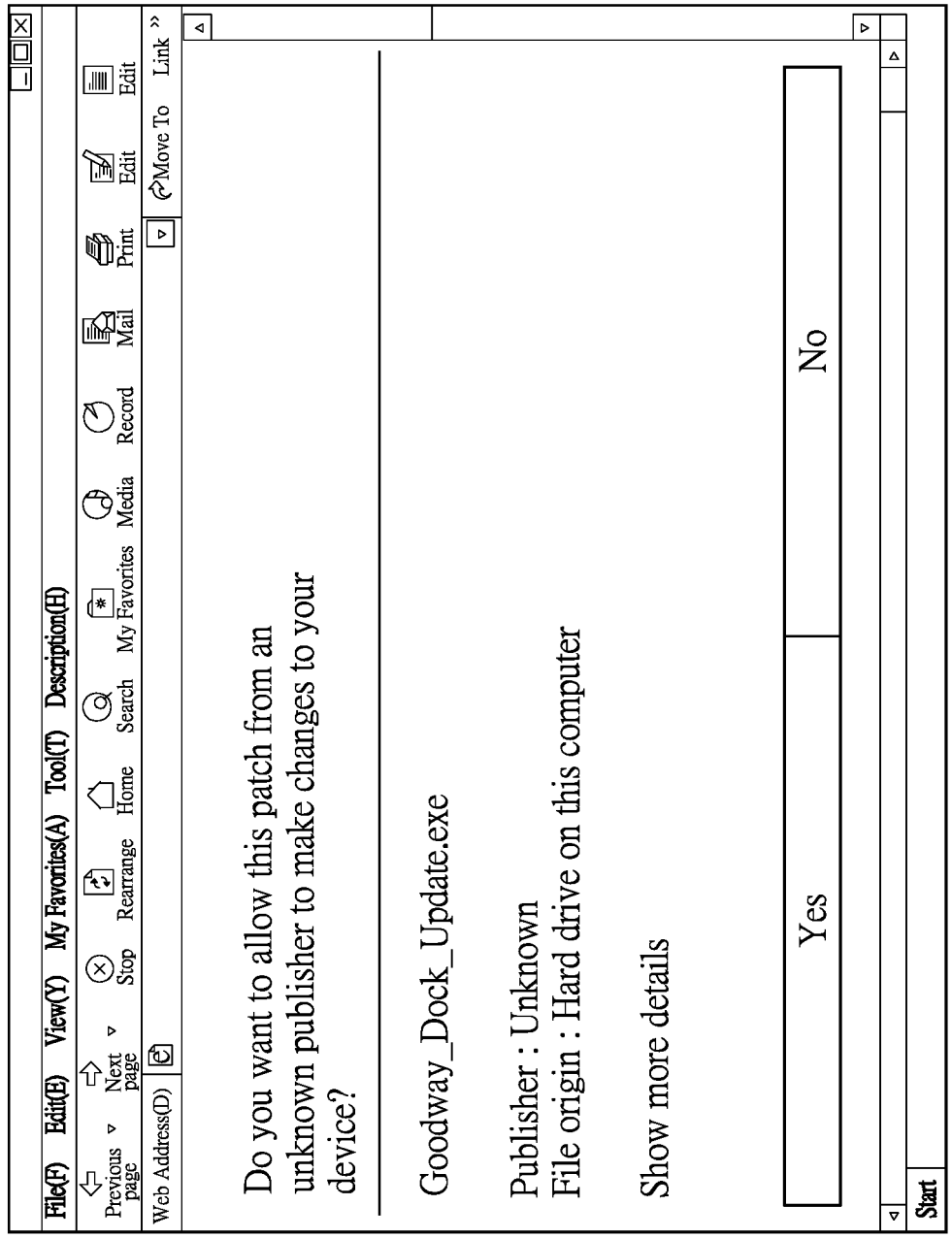
FIG. 8 is a schematic diagram of a digital signature of a deformed patch executable file that is verified to be unauthorized according to an embodiment of the present disclosure.

Reference is made to FIG. 8, which is a schematic diagram of a digital signature of a deformed patch executable file that is verified to be from an unknown source. The displayer of the electronic device prompts that the digital signature is unauthorized, and asks the user to confirm whether to update the firmware component.

Figure 9:
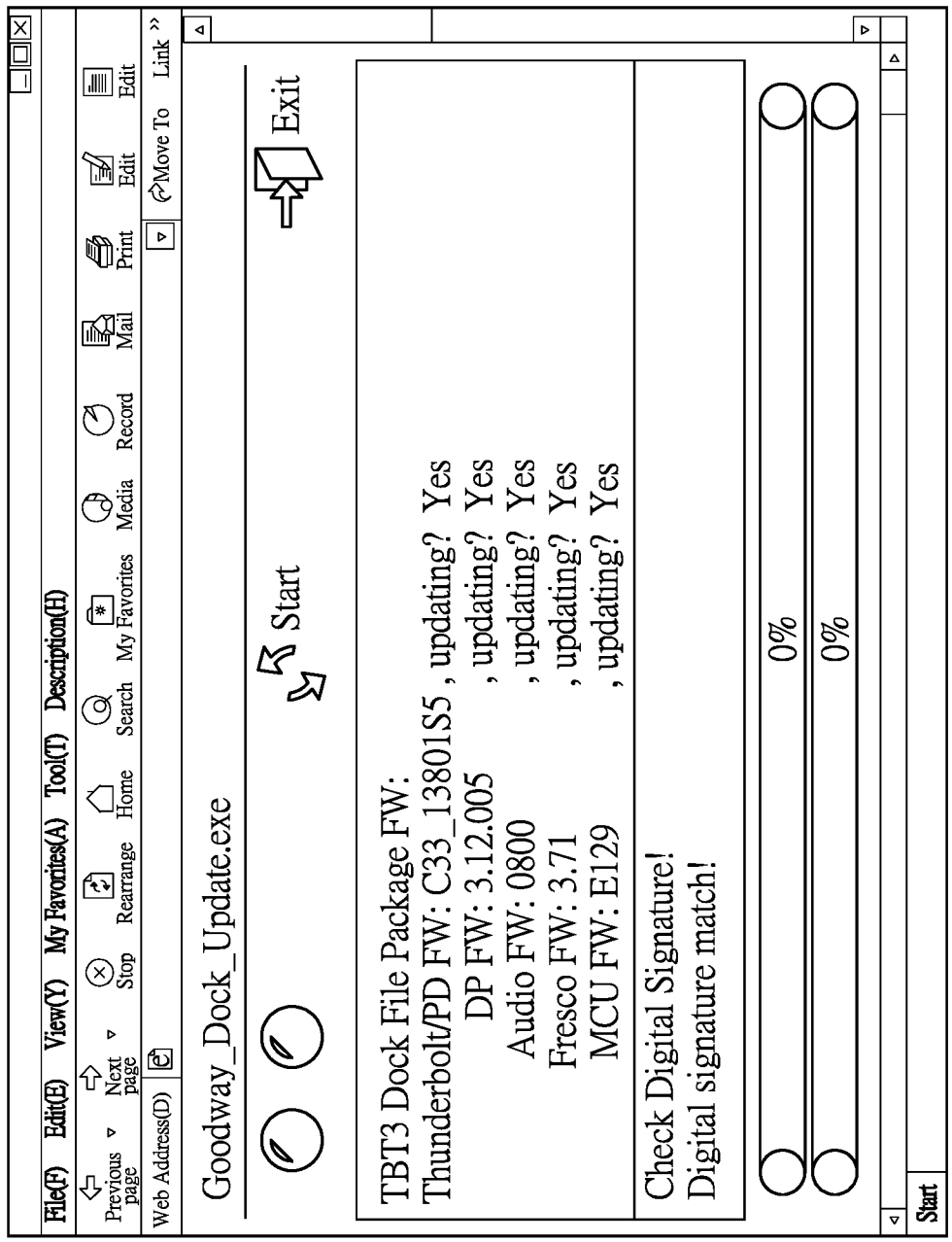
FIG. 9 is a schematic diagram of a digital signature of a deformed patch executable file that is verified to be authorized by a third-party program according to an embodiment of the present disclosure.

Reference is made to FIG. 9, which is a schematic diagram of a digital signature of a deformed patch executable that is verified to be authorized by a third-party program according to an embodiment of the present disclosure.

Figure 10:
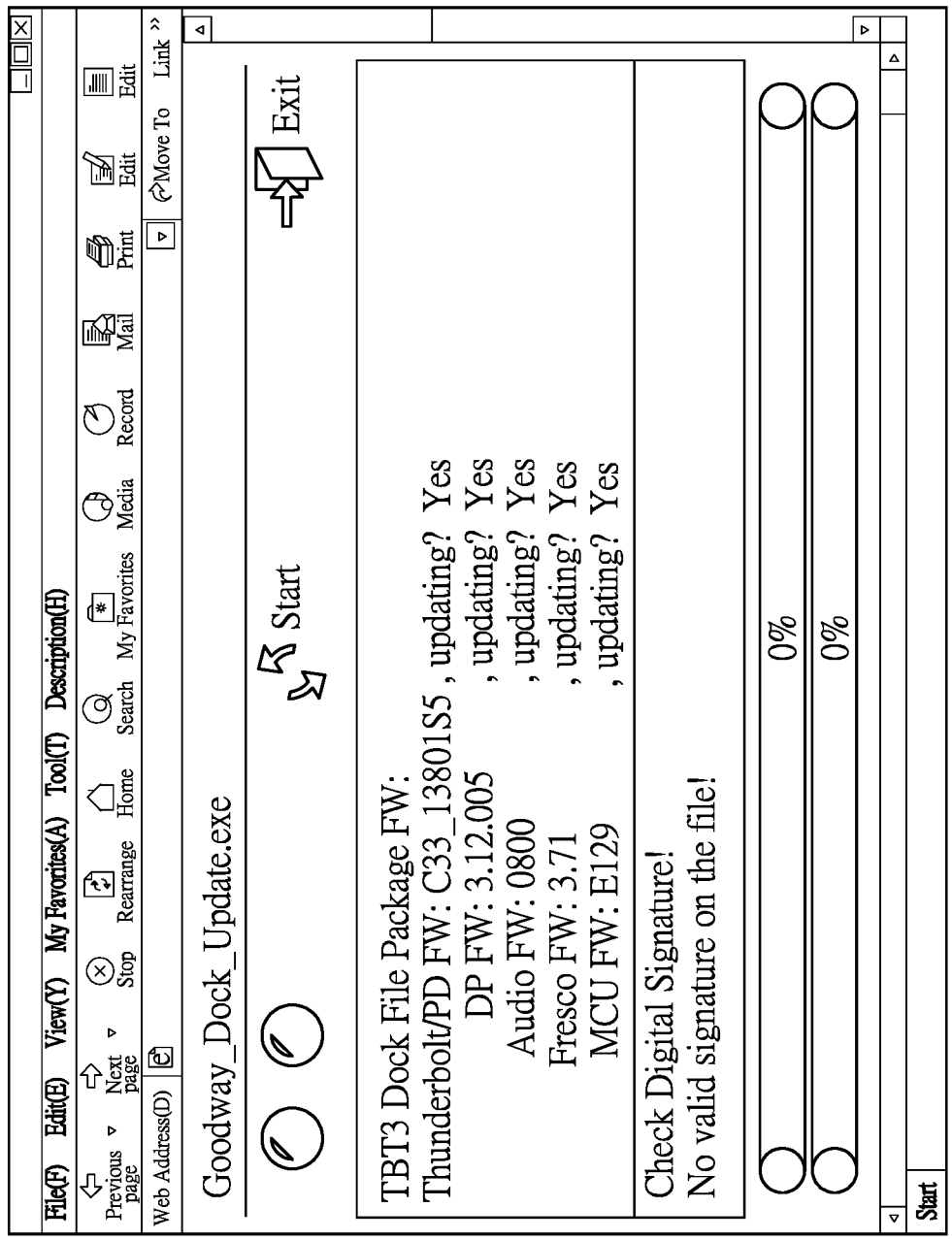
FIG. 10 is a schematic diagram of a digital signature of a deformed patch executable file that is verified to be unauthorized by a third-party program according to an embodiment of the present disclosure.

Reference is made to FIG. 10, which is a schematic diagram of a digital signature of a deformed patch executable that is verified to be unauthorized by a third-party program according to an embodiment of the present disclosure.

One skilled in the art should be able to use the computer to execute the above method and technical programs. For purposes of description, the programs and other executable components such as the operating system are separate modules as shown herein. The programs and components are stored in different memory components of the computer at different times and are executed by the processor of the computer.

In summary, the present disclosure provides the method for securely updating the firmware components and the docking station using the same to perform security update on the firmware components. The present disclosure has significant benefits by integrating the plurality of the binary files into one patch executable file. For example, the user does not have to decide which file to be updated should be executed, and does not need to select the file to be updated. The encryption program executed on the binary files may include Hash, advanced encryption standard (AES), data encryption standard (DES), RSA encryption algorithm, and elliptic curve cryptography (ECC), etc. In addition, the digital signature can be added to the patch executable file for protection. This provides the firmware components with a high level of security update.

Furthermore, since there is only one patch executable file being used, it is easy to store and maintain and the production time can be saved without signing a plurality of files at the same time. When the update program is to be executed, it can be checked whether the digital signature in the patch execution file is from the manufacturer and whether a signed content is still valid.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated.

What is claimed is:

1. A method of securely updating firmware components, in combination with an electronic device including a universal serial bus human interface device, comprising the following steps: downloading a deformed patch executable file by the electronic device, wherein the deformed patch executable file is deformed from a patch executable file including a plurality of firmware binary files, and each of the firmware binary files is configured with an address reference label; and executing the deformed patch executable file and verifying whether a digital signature of the deformed patch executable file is authorized or not, in response to the digital signature of the deformed patch executable file being determined to be authorized, providing an update tool for updating the corresponding firmware component, in response to the digital signature of the deformed patch executable file being determined to be not authorized, prompting that the digital signature is unauthorized.

2. The method of claim 1, wherein the deformed patch executable file is deformed from the patch executable file by executing a first algorithm, with which an encryption program is executed on each of the firmware binary files and a compression program is then executed on the encrypted firmware binary files.

3. The method of claim 2, further comprising a step of:
executing a digital signature program associated with the address reference labels in the firmware binary files on the deformed patch executable file.

4. The method of claim 1, wherein the deformed patch executable file is deformed from the patch executable file by executing a first algorithm, with which a compression program is executed on the firmware binary files and an encryption program is then executed on the compressed firmware binary files.

5. The method of claim 4, wherein the encryption program includes at least one of Hash, advanced encryption standard (AES), data encryption standard (DES), RSA encryption algorithm, and elliptic curve cryptography (ECC).

6. The method of claim 4, wherein the compression program includes at least one of run-length coding, dictionary coding, local conformation prediction, entropy coding, Slepian-Wolf coding, discrete cosine transform, fractal compression, fractal transform, wavelet compression, vector quantization, linear predictive coding and Wyner-Ziv coding.

7. The method of claim 4, further comprising a step of:
executing a digital signature program associated with the address reference labels in the firmware binary files on the deformed patch executable file.

8. The method of claim 4, further comprising a step of:
updating the firmware component according to an update instruction of the update tool by a micro-programmed control unit having a bootloader code for executing a second algorithm, with which a decompression program corresponding to the compression program and a decryption program corresponding to the encryption program are executed to generate at least one of the firmware binary files.

9. The method of claim 8, wherein at least one of the firmware binary files is used for a third-party program.

10. A docking station, in combination with an electronic device, comprising:
   a micro-programmed control unit;
   a universal serial bus human interface device; and
   a plurality of firmware components;
   wherein the micro-programmed control unit and the firmware components are connected to the electronic device through the universal serial bus human interface device, and the electronic device provides a deformed patch executable file, wherein the deformed patch executable file is deformed from a patch executable file including a plurality of firmware binary files, and each of the firmware binary files is configured with an address reference label;
   wherein the electronic device executes the deformed patch executable file and verifies whether a digital signature of the deformed patch executable file is authorized or not, when the digital signature of the deformed patch executable file is determined to be authorized, the electronic device provides an update instruction of an update tool for updating the corresponding firmware component, the micro-programmed control unit is configured to execute a decompression program and a decryption program with a bootloader code to generate the patch executable file, and when the digital signature of the deformed patch executable file is determined not to be authorized, the electronic device prompts that the digital signature is unauthorized.

11. The docking station of claim 10, wherein the micro-programmed control unit executes a compression program on the firmware binary files and then executes an encryption program on the compressed firmware binary files to generate the deformed patch executable file.

* * * * *